United States Patent
Nakai et al.

(10) Patent No.: US 10,604,209 B2
(45) Date of Patent: Mar. 31, 2020

(54) BICYCLE HYDRAULIC DEVICE

(71) Applicant: Shimano Inc., Sakai, Osaka (JP)

(72) Inventors: Mototsugu Nakai, Sakai (JP); Takaaki Fujiwara, Sakai (JP); Tatsuya Matsushita, Sakai (JP); Yasuyuki Komada, Sakai (JP); Etsuyoshi Watarai, Sakai (JP)

(73) Assignee: SHIMANO INC., Osaka (JP)

( * ) Notice: Subject to any disclaimer, the term of this patent is extended or adjusted under 35 U.S.C. 154(b) by 298 days.

(21) Appl. No.: 15/287,763

(22) Filed: Oct. 7, 2016

(65) Prior Publication Data

US 2018/0099724 A1 Apr. 12, 2018

(51) Int. Cl.
| | | |
|---|---|---|
| *B62L 1/00* | (2006.01) | |
| *B62L 3/02* | (2006.01) | |
| *B62K 23/06* | (2006.01) | |

(52) U.S. Cl.
CPC .............. *B62L 3/023* (2013.01); *B62K 23/06* (2013.01); *B62L 1/005* (2013.01)

(58) Field of Classification Search
CPC ......... B63K 23/06; B62L 3/023; B60T 7/102; B60T 11/16; B60T 11/18; B60T 11/22; B60T 11/165; B60T 11/232; B60T 11/236; F16D 65/28; F16B 1/28
USPC ......... 188/344; 74/473.14, 473.15, 488, 489, 74/501.5 H, 202, 502.2
See application file for complete search history.

(56) References Cited

U.S. PATENT DOCUMENTS

| | | | | |
|---|---|---|---|---|
| 3,206,933 A | * | 9/1965 | Dega ...................... | B60T 11/22 141/346 |
| 3,790,807 A | * | 2/1974 | Rossigno ................ | B60T 13/58 303/7 |
| 4,208,881 A | * | 6/1980 | Brademeyer ......... | B60T 11/224 137/513.7 |
| 4,445,333 A | * | 5/1984 | Coleman ................ | B60T 11/22 137/513.3 |
| 4,445,334 A | * | 5/1984 | Derrick ................. | B60T 11/224 60/578 |
| 4,773,224 A | * | 9/1988 | Sakamoto ............... | B60T 11/16 60/585 |
| 6,014,862 A | * | 1/2000 | Shaw ...................... | B60T 7/042 60/533 |
| 2005/0056110 A1 | * | 3/2005 | Laghi ...................... | B60T 11/22 74/489 |
| 2007/0283691 A1 | | 12/2007 | Tetsuka et al. | |
| 2008/0276612 A1 | * | 11/2008 | Egawa ................... | B60T 11/232 60/562 |
| 2015/0321725 A1 | | 11/2015 | Kariyama et al. | |
| 2016/0347403 A1 | * | 12/2016 | Watarai ................... | B62L 3/023 |

* cited by examiner

*Primary Examiner* — Robert A. Siconolfi
*Assistant Examiner* — San M Aung

(57) ABSTRACT

A bicycle hydraulic device includes a cylinder including a cylinder bore, a piston located in the cylinder bore and movable between an initial position and an actuation position, a reservoir tank that is in fluidal communication with the cylinder bore through a communication port, and a flow modulator configured to modulate a flow behavior of a fluid in accordance with a direction in which the fluid flows in the communication port.

19 Claims, 6 Drawing Sheets

BICYCLE HYDRAULIC DEVICE

FIELD

The present invention relates to a bicycle hydraulic device that may be used for, for example, a bicycle hydraulic brake.

BACKGROUND

There are various kinds of bicycle hydraulic systems. A bicycle hydraulic system for a bicycle hydraulic brake or the like includes a hydraulic operating device, which may be a brake lever device, a hydraulic operated device, which may be a brake caliper, and a hydraulic hose, which connects the hydraulic operating device and the hydraulic operated device. The hydraulic operating device includes a master cylinder and a cylinder bore that accommodates a master piston. The master piston moves in the cylinder bore from an initial position to an actuation position when an operation member such as a hand lever is pivoted. The movement of the master piston discharges a fluid (here, oil) out of the master cylinder. The fluid drives a slave piston accommodated in the brake caliper through the hydraulic hose. Consequently, the brake caliper generates braking force.

The hydraulic operating device may include a reservoir tank (also referred to as fluid reservoir). When the master piston is located at the initial position, the reservoir tank is in fluidal communication with the cylinder bore of the master cylinder through a communication port. When the master piston is located at the actuation position, the fluidal communication of the reservoir tank and the communication port with the cylinder bore of the master cylinder is interrupted.

SUMMARY

It is an object of the present invention to provide a novel structure for a communication port that is located between a cylinder bore and a reservoir tank of a bicycle hydraulic device.

A first aspect of the present invention is a bicycle hydraulic device that includes a cylinder including a cylinder bore, a piston located in the cylinder bore and movable between an initial position and an actuation position, a reservoir tank that is in fluidal communication with the cylinder bore through a communication port, and a flow modulator configured to modulate a flow behavior of a fluid in accordance with a direction in which the fluid flows in the communication port. The bicycle hydraulic device according to the first aspect includes the flow modulator. This allows the fluid flowing in the communication port in a first direction and the fluid flowing in the communication port in a second direction to have different flow behaviors.

In a second aspect of the bicycle hydraulic device according to the first aspect, the flow modulator is configured so that a first path resistance at the communication port in a state where the fluid is directed from the cylinder bore toward the reservoir tank differs from a second path resistance at the communication port in a state where the fluid is directed from the reservoir tank toward the cylinder bore. The bicycle hydraulic device according to the second aspect sets or adjusts the first and second path resistances, which respectively correspond to the fluids flowing in the two opposite directions. This allows the fluids flowing in the communication port in the two opposite directions to have different flow behaviors. For example, the fluid directed from the cylinder bore toward the reservoir tank and the fluid directed from the reservoir tank toward the cylinder bore may have different maximum flow rates.

In a third aspect of the bicycle hydraulic device according to the second aspect, the flow modulator is configured so that the second path resistance is larger than the first path resistance. The bicycle hydraulic device according to the third aspect sets or adjusts the path resistances. This allows the fluid directed from the cylinder bore toward the reservoir tank to have a higher maximum flow rate than the fluid directed from the reservoir tank toward the cylinder bore.

In a fourth aspect of the bicycle hydraulic device according to any one of the first to third aspects, the flow modulator includes a valve member arranged in the reservoir tank. The valve member is capable of opening and closing at least part of the communication port. In the bicycle hydraulic device according to the fourth aspect, the valve member is arranged in the reservoir tank. This allows the fluids flowing in the communication port in the two opposite directions to have different flow behaviors, for example, without changing a conventional piston and a conventional cylinder.

In a fifth aspect of the bicycle hydraulic device according to the fourth aspect, the flow modulator further includes a biasing member that biases the valve member toward the communication port. The bicycle hydraulic device according to the fifth aspect sets or adjusts the biasing force of the biasing member against the valve member. This allows the fluids flowing in the communication port in the two opposite directions to have different flow behaviors.

A sixth aspect of the present invention is a bicycle hydraulic device that includes a cylinder including a cylinder bore, a piston located in the cylinder bore and movable between an initial position and an actuation position, a reservoir tank that is in fluidal communication with the cylinder bore through a communication port, and a valve member arranged in the reservoir tank. The valve member is capable of opening and closing at least part of the communication port in accordance with a flow of a fluid in the communication port. In the bicycle hydraulic device according to the sixth aspect, the valve member is arranged in the reservoir tank. This allows the fluids flowing in the communication port in the two opposite directions to have different flow behaviors, for example, without changing a conventional piston and a conventional cylinder.

A seventh aspect of the bicycle hydraulic device according to the sixth aspect further includes a biasing member that biases the valve member toward the communication port. The bicycle hydraulic device according to the seventh aspect sets or adjusts the biasing force of the biasing member against the valve member. This allows the fluids flowing in the communication port in the two opposite directions to have different flow behaviors.

In an eighth aspect of the bicycle hydraulic device according to the fifth or seventh aspect, the biasing member produces a biasing force that is set so that the valve member is separated from the communication port by a fluid flowing from the cylinder toward the reservoir tank through the communication port. The bicycle hydraulic device according to the eighth aspect allows the fluid directed from the cylinder bore toward the reservoir tank to open the communication port, which is closed by the valve member.

In a ninth aspect of the bicycle hydraulic device according to any one of the fourth to eighth aspects, the communication port includes a first through hole and a second through hole, which is aligned with the first through hole in a circumferential direction of the cylinder. The valve member is arranged to be capable of opening and closing at least part of only the first through hole. The bicycle hydraulic device according to the ninth aspect sets or adjusts the number of valve members. This allows the fluids flowing in the communication port in the two opposite directions to have different flow behaviors.

In a tenth aspect of the bicycle hydraulic device according to the ninth aspect, the first through hole has a first flow passage cross-sectional area, and the second through hole has a second flow passage cross-sectional area that differs from the first flow passage cross-sectional area. The bicycle hydraulic device according to the tenth aspect sets or adjusts the flow passage cross-sectional areas of the first through hole and the second through hole. This allows the fluids flowing in the communication port in the two opposite directions to have different flow behaviors.

In an eleventh aspect of the bicycle hydraulic device according to the tenth aspect, the first flow passage cross-sectional area is larger than the second flow passage cross-sectional area. In the bicycle hydraulic device according to the eleventh aspect, the valve member closes the first through hole, which has a larger flow passage cross-sectional area. This increases the difference in the flow behaviors between the fluids flowing in the communication port in the two opposite directions.

In a twelfth aspect of the bicycle hydraulic device according to any one of the fourth to eleventh aspects, the valve member includes an orifice that fluidly communicates the communication port and the reservoir tank in a state where the valve member covers the communication port. The bicycle hydraulic device according to the twelfth aspect sets or adjusts the flow passage cross-sectional area of the orifice. This increases or decreases the difference in the flow behaviors between the fluids flowing in the communication port in the two opposite directions.

In a thirteenth aspect of the bicycle hydraulic device according to any one of the fourth to twelfth aspects, the valve member is connected to the tank wall of the reservoir tank by a hinge. In the bicycle hydraulic device according to the thirteenth aspect, the hinge located in the reservoir tank, which is filled with the fluid, allows for smooth movement of the valve member.

A fourteenth aspect of the bicycle hydraulic device according to any one of the fourth to twelfth aspects further includes a movement mechanism that moves the valve member between a first position where the communication port is closed and a second position where the communication port is open. The bicycle hydraulic device according to the fourteenth aspect allows the user to hold the communication port in an open state or a closed state with the valve member. This obtains both the normal function of the bicycle hydraulic device and the ease for maintaining the bicycle hydraulic device.

In a fifteenth aspect of the bicycle hydraulic device according to the fourteenth aspect, the movement mechanism includes a magnet that holds the valve member at the second position in a contactless manner from outside the cylinder and the reservoir tank. In the bicycle hydraulic device according to the fifteenth aspect, the communication port is held in the open state by magnetic attraction force or magnetic repulsion force from outside the reservoir tank.

In a sixteenth aspect of the bicycle hydraulic device according to the fourteenth aspect, the movement mechanism includes a manual operation portion located outside the reservoir tank and moved by a manual operation, and a connection portion connected to the valve member inside the reservoir tank to transmit movement of the manual operation portion to the valve member. The bicycle hydraulic device according to the sixteenth aspect allows the user to manually hold the communication port in the open state or closed state from outside the reservoir tank.

In a seventeenth aspect of the bicycle hydraulic device according to the first aspect, the communication port includes a through hole that includes a first opening, which is located in a wall defining the cylinder bore, and a second opening, which is located in a tank wall of the reservoir tank. The through hole includes a conical portion defined by an inclined surface that defines at least part of the through hole and is inclined relative to a hole axis of the through hole. The flow modulator includes the conical portion. In the bicycle hydraulic device according to the seventeenth aspect, the conical portion of the communication port functions as the flow modulator. Thus, the flow modulator is formed by a stationary member.

In an eighteenth aspect of the bicycle hydraulic device according to the seventeenth aspect, one end of the conical portion is defined by one of the first opening and the second opening, and the through hole further includes a cylindrical bore portion that extends from another end of the conical portion with a uniform inner diameter. In the bicycle hydraulic device according to the eighteenth aspect, the conical portion cooperates with the cylindrical bore portion to adjust the flow of the fluid.

In a nineteenth aspect of the bicycle hydraulic device according to the eighteenth aspect, the first opening has a first area, the second opening has a second area, and the first area is larger than the second area. The bicycle hydraulic device according to the nineteenth aspect sets or adjusts the first and second areas. This allows the fluid directed from the cylinder bore toward the reservoir tank to have a higher maximum flow rate than the fluid directed from the reservoir tank toward the cylinder bore.

A twentieth aspect of the bicycle hydraulic device according to any one of the first to nineteenth aspects further includes a body including the cylinder, and a lever arranged on the body. The lever is pivotal about an axis of the lever between a rest position and an operation position. The bicycle hydraulic device according to the twentieth aspect allows the fluids flowing in the communication port arranged in a hydraulic operating portion that includes the lever in the first direction and the second direction to have different flow behaviors.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

Figure 1:
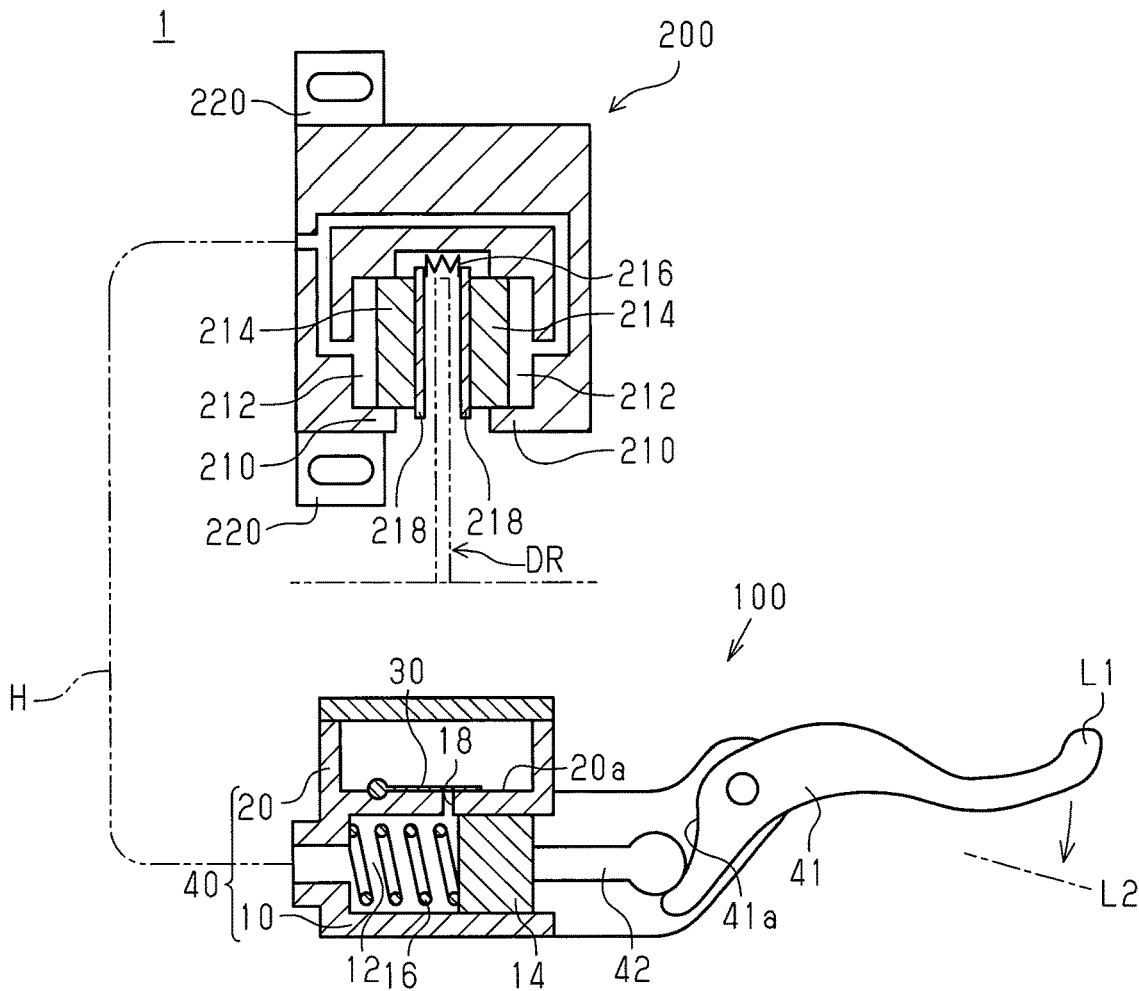
FIG. 1 is an schematic diagram of a bicycle hydraulic system that includes a first embodiment of a bicycle hydraulic device.

A bicycle hydraulic system 1 will now be described with reference to FIG. 1. The bicycle hydraulic system 1 includes a bicycle hydraulic operating device 100 (hereafter, simply referred to as hydraulic operating device), which may be a brake lever device, a bicycle hydraulic operated device 200 (hereafter, simply referred to as hydraulic operated device), which may be a brake caliper, and a hydraulic hose H, which connects the hydraulic operating device 100 and the hydraulic operated device 200 to allow for hydraulic communication between the hydraulic operating device 100 and the hydraulic operated device 200.

The hydraulic operating device 100 is, for example, coupled to a bicycle handlebar or a bicycle frame by a clamp. When the user, who may be the rider of the bicycle, manually operates the hydraulic operating device 100, the hydraulic operating device 100 discharges a hydraulic fluid (hereafter, may be simply referred to as fluid) to the hydraulic operated device 200 through the hydraulic hose H to actuate the hydraulic operated device 200.

The hydraulic operated device 200 includes two slave cylinders 210, each of which includes a slave cylinder bore 212, slave pistons 214, which are respectively located in the slave cylinders 212, and a spring 216. The spring 216 biases the slave pistons 214 in directions in which the slave pistons 214 are separated away from each other. When the hydraulic operating device 100 is operated, the slave pistons 214 move against the biasing force of the spring 216. In the first embodiment, when the slave pistons 214 press friction members or brake pads 218 against a rotor DR, which may be a brake disc rotor, the hydraulic operated device 200 generates braking force. The hydraulic operated device 200 may include a bracket 220, which is fixed to the bicycle frame.

The structure of the hydraulic operating device 100, which is a preferred example of a bicycle hydraulic device, will now be described. As shown in FIG. 1, the hydraulic operating device 100 includes a master cylinder 10 (hereafter, may be simply referred to as cylinder), which includes a master cylinder bore 12 (hereafter, may be simply referred to as cylinder bore), a master piston 14 (hereafter, may be simply referred to as piston), which is located in the cylinder bore 12 and movable between an initial position P1 and an actuation position P3 shown in FIG. 2, a reservoir tank 20, which is in fluidal communication with the cylinder bore 12 through a communication port 18, and a flow modulator 30, which is configured to modulate a flow behavior of the fluid in accordance with the direction in which the fluid flows in the communication port 18.

The hydraulic operating device 100 includes a body 40, which includes the cylinder 10, and a hand lever 41 (hereafter, simply referred to as lever), which is arranged on the body 40 to be pivotal about a lever axis LA between a rest position L1 and an operation position L2. The lever 41 is connected to the piston 14 by a connection mechanism that includes a connecting rod 42. Although not restrictive, the pivoting of the lever 41 is converted into a linear motion of the piston 14 by rolling contact between a cam surface 41*a* of the lever 41 and the connecting rod 42. The hydraulic operating device 100 includes an external connection port 10*a*, which connects the cylinder 10 to the hydraulic hose H. The cylinder bore 12 accommodates a piston return spring 16, which biases the piston 14 toward the initial position P1. The return spring 16 of the first embodiment is engaged with or connected to the piston 14 and the cylinder 10 in a compressed manner. When the lever 41 is pivoted from the rest position L1 to the operation position L2 against the biasing force of the piston return spring 16, the hydraulic operating device 100 discharges the fluid through the external connection port 10*a*.

Figure 2:
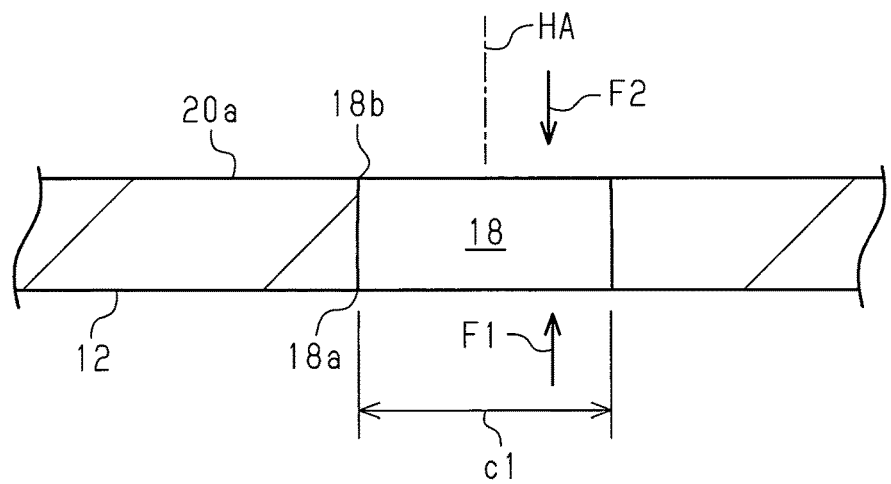
FIG. 2 is an enlarged cross-sectional view of a communication port located between a cylinder bore and a reservoir tank.

As shown in FIG. 2, in the first embodiment, the communication port 18 includes a through hole that includes a first opening 18*a*, which is located in a wall defining the cylinder bore 12, a second opening 18*b*, which is located in a tank wall 20*a* (bottom wall) of the reservoir tank 20, a hole axis HA, and a flow passage cross-sectional area c1. Although not restrictive, the communication port 18 may be a circular bore the flow passage cross-sectional area of which is uniform from the first opening 18*a* to the second opening 18*b*. When using the hydraulic operating device 100, the fluid flows through the communication port 18 in two opposite directions indicated by arrows F1, F2. More specifically, the fluid flows in the first direction F1, which extends from the cylinder bore 12 toward the reservoir tank 20 through the communication port 18, and in the second direction F2, which extends from the reservoir tank 20 toward the cylinder bore 12 through the communication port 18.

Figure 3:
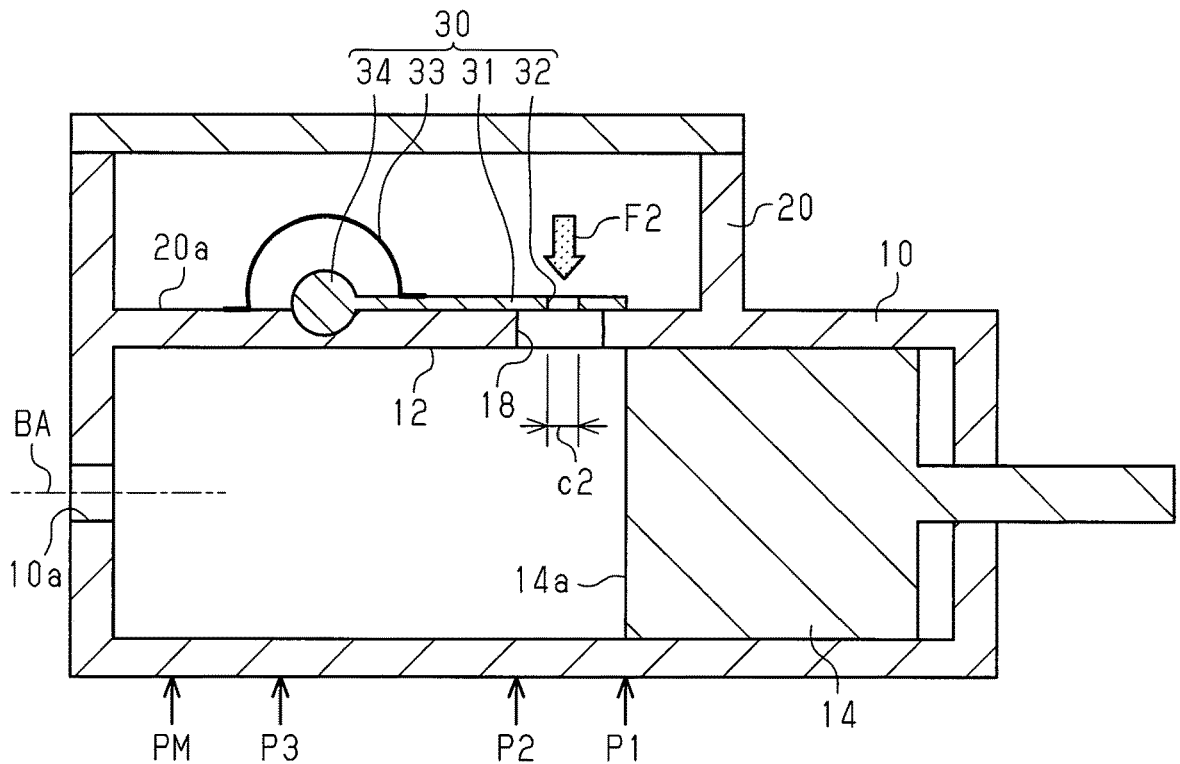
FIGS. 3 and 4 are schematic cross-sectional views showing the bicycle hydraulic device of the first embodiment.
Figure 4:
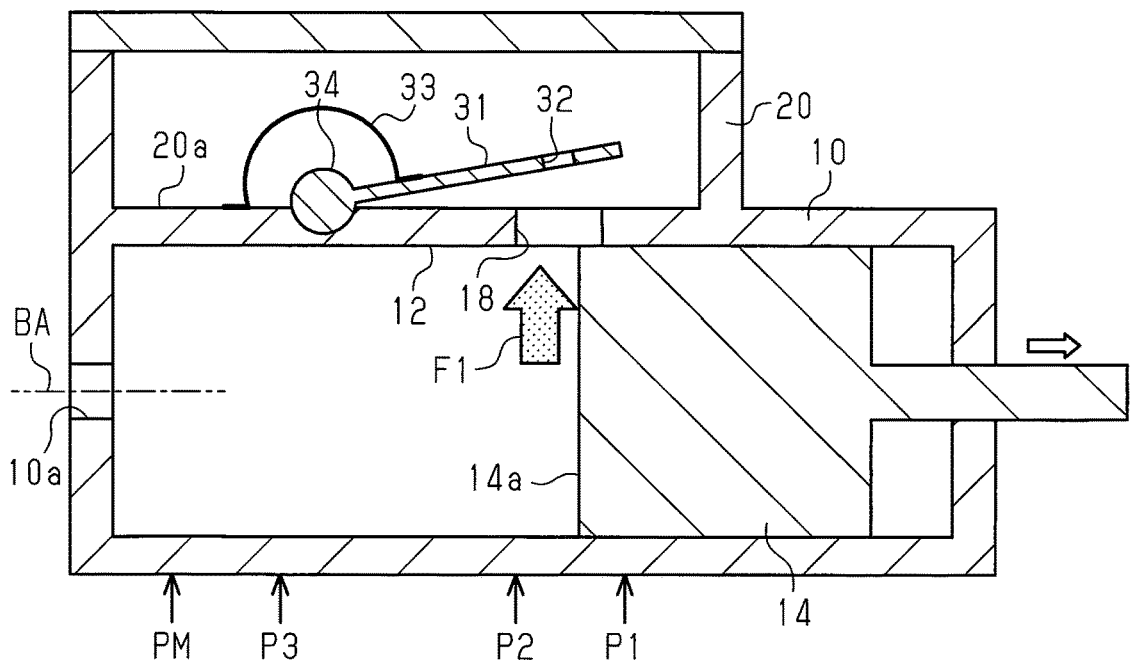

The flow modulator 30 of the first embodiment will now be described with reference to FIGS. 3 and 4. In the first embodiment, the flow modulator 30 includes a valve member 31, which is arranged in the reservoir tank 20 to open and close at least part of the communication port 18. The valve member 31 is movable between a first position (FIG. 3) where the communication port 18 is closed and a second position (FIG. 4) where the communication port 18 is open.

The valve member 31 includes an orifice 32, which fluidly communicates the communication port 18 and the reservoir tank 20 in a state where the valve member 31 covers the communication port 18. In the first embodiment, the valve member 31 includes an upper surface, which is in contact with the fluid in the reservoir tank 20, and a lower surface, which is in contact with the fluid in the communication port 18, and may be, for example, a flat plate. The orifice 32 is a through hole extending through the valve member 31. The flow passage cross-sectional area c2 of the orifice 32 is smaller than the flow passage cross-sectional area c1 of the communication port 18. Thus, in a state where the communication port 18 is closed by the valve member 31, the orifice 32 (flow passage cross-sectional area c2) of the valve member 31 limits the maximum flow rate of the fluid between the reservoir tank 20 and the cylinder bore 12. In a state where the valve member 31 opens the communication port 18, the communication port 18 (flow passage cross-sectional area c1) limits the maximum flow rate of the fluid between the reservoir tank 20 and the cylinder bore 12.

In the first embodiment, the flow modulator 30 includes a biasing member 33, which biases the valve member 31 toward the communication port 18. The biasing member 33 produces a biasing force that is set so that the valve member 31 is separated from the communication port 18 by the fluid flowing through the communication port 18 toward the reservoir tank 20 from the cylinder 10. In a state where the fluid does not flow through the communication port 18 in either direction, the valve member 31 closes the communication port 18 with the biasing force of the biasing member 33. In a state where the fluid flows from the reservoir tank 20 toward the cylinder 10, the valve member 31 closes the communication port 18 with the biasing force of the biasing member 33 and the pressure of the fluid. The biasing member 33 is not particularly limited as long as the biasing member 33 is an elastic member such as a torsion spring, a plate spring, or a coil spring.

The valve member 31 is connected, for example, to the tank wall 20a of the reservoir tank 20 by a hinge 34.

In the present description, the terms of "closing the communication port 18" may refer to "increasing the resistance of the flow passage between the reservoir tank 20 and the cylinder bore 12." Additionally, the terms of "the communication port 18 is closed" may refer to "the resistance of the flow passage between the reservoir tank 20 and the cylinder bore 12 is maximized."

The operation of the flow modulator 30 of the first embodiment will now be described. The flow modulator 30 is configured so that a first path resistance at the communication port 18 in a state where the fluid is directed from the cylinder bore 12 toward the reservoir tank 20 differs from a second path resistance at the communication port 18 in a state where the fluid is directed from the reservoir tank 20 toward the cylinder bore 12. In the first embodiment, in a state where the valve member 31 is located at the first position (FIG. 3), the orifice 32 functions as a bottleneck. Thus, the second path resistance of the fluid directed from the reservoir tank 20 toward the cylinder bore 12 in the communication port 18 becomes larger than the first path resistance.

The operation of the hydraulic operating device 100 of the first embodiment will now be described.

The positions of the piston 14 and the communication port 18 will be first described. As shown in FIG. 3, the piston 14 (more specifically, piston head surface 14a) is movable between the initial position P1 and a maximum forward position PM. In a state where the piston 14 is located at the initial position P1, the piston 14 does not cover the communication port 18. In a state where the piston 14 is located at a pressurization start position or a closed position P2, which is separated from the initial position P1 by a predetermined distance along a bore axis BA of the cylinder bore 12, the piston 14 covers the communication port 18. This interrupts the communication between the cylinder bore 12 and the reservoir tank 20 through the communication port 18. The actuation position P3 of the piston 14 may be any position in an actuation region located between the closed position P2 and the maximum forward position PM.

In the description hereafter, the stroke of the piston 14 from the initial position P1 to the closed position P2 may be referred to as the initial forward stroke. Also, the stroke of the piston 14 from the closed position P2 to the actuation position P3 may be referred to as the brake forward stroke. The stroke of the piston 14 from the actuation position P3 to the initial position P1 may be referred to as the return stroke.

Referring to FIG. 2, in a state where the lever 41 is still at the rest position L1, the piston 14 is still at the initial position P1 and the communication port 18 is closed by the valve member 31, which is biased by the biasing member 33. The reservoir tank 20 is in communication with the cylinder bore 12 through the orifice 32 of the valve member 31 and the communication port 18.

When the user pivots the lever 41 from the rest position L1 to the operation position L2, the piston 14 is moved forward from the initial position P1 along the bore axis BA.

When the piston 14 reaches the closed position P2 to completely cover the communication port 18, the fluid starts to discharge from the external connection port 10a. In the brake forward stroke, in which the piston 14 moves from the closed position P2 to the actuation position P3, the communication port 18 is closed by the piston 14 and the valve member 31. The fluid is discharged from the cylinder bore 12 through the external connection port 10a by an amount corresponding to the movement of the piston 14. This increases the pressing force, or the braking force, of the brake pads 218 applied to the rotor DR.

If the user cancels the operation of the lever 41 in a state where the piston 14 is located at the actuation position P3, the lever 41 and the piston 14 are respectively returned to the rest position L1 and the initial position P1 mainly by the biasing force of the piston return spring 16. At this time, each slave piston 214 is returned to the initial position of the slave piston 214 by the biasing force of the spring 216 in the hydraulic operated device 200. This cancels the pressing of the brake pads 218 against the rotor DR.

During the return stroke of the piston 14, a flow of the fluid returning from the hydraulic hose H to the cylinder bore 12 of the hydraulic operating device 100 is generated. In the final stage of the return stroke, in which the piston 14 is moved from the closed position P2 to the initial position P1, the piston 14 cancels the interruption of the communication port 18. The valve member 31 receives the flow of the fluid directed (in first direction F1) toward the reservoir tank 20 from the cylinder bore 12 through the communication port 18. This opens the valve member 31 in a manner separated from the communication port 18. The fluid flows from the cylinder bore 12 to the reservoir tank 20 through the communication port 18 and the open valve member 31 in the first direction F1.

In a state where the piston 14 is in the final stage of the return stroke or when or after the return stroke is completed, the pressure of the cylinder bore 12 and the pressure of the reservoir tank 20 become proximate to equilibrium. This attenuates the flow of the fluid in the first direction F1. Consequently, the valve member 31 is closed by the biasing force of the biasing member 33. In a state where the valve member 31 is closed, the orifice 32 allows the fluid to flow from the reservoir tank 20 to the cylinder bore 12 in the second direction F2.

The second path resistance, which corresponds to the flow of the fluid in the communication port 18 in the second direction F2, is larger than the first path resistance, which corresponds to the flow of the fluid in the communication port 18 in the first direction F1. This allows the fluid to flow from the reservoir tank 20 to the cylinder bore 12 at a relatively low first flow rate and from the cylinder bore 12 to the reservoir tank 20 at a relatively high second flow rate.

The first embodiment has the advantages described below.

The valve member 31 of the flow modulator 30 is moved in accordance with the direction in which the fluid flows in the communication port 18. This allows the fluids flowing in the first direction F1 and the second direction F2 to have different flow behaviors. More specifically, when the piston 14 is moved between the initial position P1 and the maximum forward position PM, the valve member 31 appropriately opens and closes in accordance with the difference in pressure between the fluid in the cylinder bore 12 and the fluid in the reservoir tank 20. This obtains a desired operation response.

The valve member 31 moves when receiving the flow of the fluid. This allows the fluids flowing in the first direction F1 and the second direction F2 to have different maximum flow rates. Thus, the return stroke of the piston 14 is smooth.

The valve member 31 moves when receiving the flow of the fluid. This quickly attenuates pressure oscillation, or pulse pressure, in each of the cylinder bore 12 and the reservoir tank 20.

The valve member 31 is located in the reservoir tank 20. This avoids enlargement of the piston 14 and the cylinder 10.

Other embodiments and modified examples will now be described below. In the description hereafter, for the sake of brevity, the same reference characters are given to those components that are the same as the corresponding components of the first embodiment.

Figure 5:
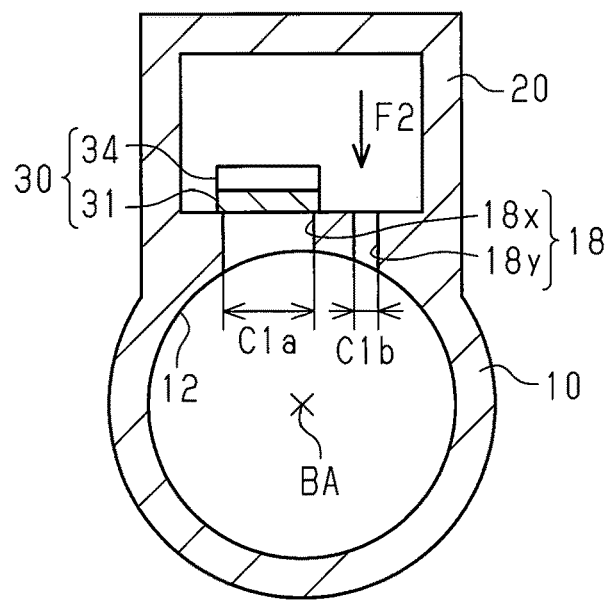
FIGS. 5 and 6 are schematic cross-sectional views showing a second embodiment of a bicycle hydraulic device.

A second embodiment of a hydraulic operating device 100 will now be described with reference to FIGS. 5 and 6.

In the second embodiment, the communication port 18 includes a first through hole 18x and a second through hole 18y, which is aligned with the first through hole 18x in a circumferential direction of the cylinder 10. The flow modulator 30 includes a valve member 31 that is capable of opening and closing at least part of only the first through hole 18x. The circumferential direction of the cylinder 10 is the direction that is orthogonal to a radial direction of the cylinder bore 12 and the bore axis BA. In the same manner as the first embodiment, the valve member 31 is biased toward the first through hole 18x by the biasing member 33. In the second embodiment, the valve member 31 does not include the orifice 32. This allows the valve member 31 to completely close the first through hole 18x.

Figure 6:
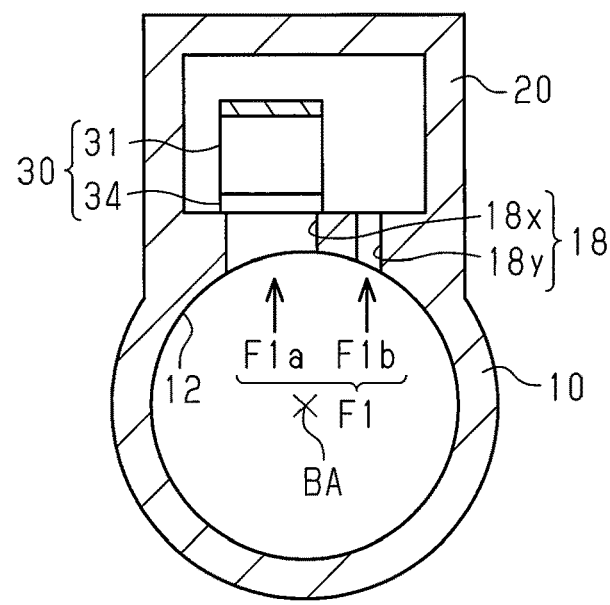

As shown in FIG. 6, the first through hole 18x has a first flow passage cross-sectional area c1a, and the second through hole 18y has a second flow passage cross-sectional area c1b, which differs from the first flow passage cross-sectional area c1a. In the second embodiment, the first flow passage cross-sectional area c1a is larger than the second flow passage cross-sectional area c1b. As shown in FIG. 5, in a state where the valve member 31 closes the first through hole 18x, the flow passage cross-sectional area of the communication port 18 is equal to the second flow passage cross-sectional area c1b. As shown in FIG. 6, in a state where the valve member 31 is separated from the first through hole 18x, the flow passage cross-sectional area of the communication port 18 is equal to the sum of the first flow passage cross-sectional area c1a and the second flow passage cross-sectional area c1b.

The operation of the hydraulic operating device 100 and the flow modulator 30 of the second embodiment will now be described.

In a state where the piston 14 is still at the initial position P1, the first through hole 18x is closed by the valve member 31. In a state where the piston 14 is located at the initial position P1, the second through hole 18y communicates the cylinder bore 12 and the reservoir tank 20 regardless of movement of the valve member 31 and the structure of the valve member 31.

In the initial forward stroke, in which the piston 14 is moved from the initial position P1 to the closed position P2, a portion of the fluid in the cylinder bore 12 opens the valve member 31 so that the valve member 31 is separated from the first through hole 18x and flows to the reservoir tank 20 through the opened first through hole 18x (indicated by arrow F1a). Further, another portion of the fluid flows to the reservoir tank 20 through the second through hole 18y (indicated by arrow F1b).

When the piston 14 is moved from the initial position P1 to the closed position P2, the piston 14 interrupts the communication between the cylinder bore 12 and the reservoir tank 20 through the first through hole 18x and the second through hole 18y.

If the user cancels the operation of the lever 41 in a state where the piston 14 is located at the actuation position P3, the piston 14 returns to the initial position P1 from the actuation position P3. In the final stage of the return stroke, in which the piston 14 moves from the closed position P2 to the initial position P1, the piston 14 cancels the interruption of the first through hole 18x and the second through hole 18y. When the valve member 31 receives the flow of the fluid directed (in first direction F1) from the cylinder bore 12 toward the reservoir tank 20 through the first through hole 18x, the valve member 31 is separated from the first through hole 18x. A portion of the fluid flows from the cylinder bore 12 to the reservoir tank 20 through the first through hole 18x and the opened valve member 31 in the first direction F1. Another portion of the fluid flows from the cylinder bore 12 to the reservoir tank 20 through the second through hole 18y in the first direction F1.

When the piston 14 is in the final stage of the return stroke or when or after the return stroke is completed, the pressure of the cylinder bore 12 and the pressure of the reservoir tank 20 become proximate to equilibrium. This attenuates the flow of the fluid in the first direction F1. Consequently, the valve member 31 is closed by the biasing force of the biasing member 33. When the valve member 31 is closed, the flow of the fluid through the first through hole 18x is interrupted. The second through hole 18y allows the fluid to flow from the reservoir tank 20 to the cylinder bore 12 in the second direction F2.

As described above, in the same manner as the first embodiment, the flow modulator 30 of the second embodiment allows the fluid flowing in the communication port (first through hole 18x and second through hole 18y) in two opposite directions to have different flow behaviors. The second path resistance is larger than the first path resistance, which corresponds to the flow of the fluid in the communication port (first through hole 18x and second through hole 18y) in the first direction F1. This allows the fluid to flow from the reservoir tank 20 to the cylinder bore 12 at the relatively low first flow rate and from the cylinder bore 12 to the reservoir tank 20 at the relatively high second flow rate.

A third embodiment of a hydraulic operating device 100 will now be described focusing on the differences from the first embodiment with reference to FIG. 7. In the third embodiment, the communication port 18 includes a through hole that includes a first opening 18a, which is located in the wall of the cylinder bore 12, and a second opening 18b, which is located in the tank wall 20a of the reservoir tank 20. The through hole includes a conical portion 18e defined by an inclined surface 18d, which defines at least part of the through hole and is inclined relative to the hole axis HA of the through hole. The flow modulator 30 includes the conical portion 18e of the communication port 18.

The conical portion 18e has one end defined by the first opening 18a. The through hole, which functions as the communication port 18, further includes a cylindrical bore portion 18f. The cylindrical bore portion 18f extends from another end of the conical portion 18e or a step 18c with a uniform inner diameter. In the third embodiment, the cylindrical bore portion 18f opens in the tank wall 20a of the reservoir tank 20. The through hole, which functions as the communication port 18, may be referred to as a stepped through hole that includes the conical portion 18e and the cylindrical bore portion 18f.

The flow modulator 30 allows the fluids flowing in the communication port 18 in the first direction F1 and the second direction F2 to have different flow behaviors by setting or adjusting the configuration of the communication port 18 such as the angle of the inclined surface 18d relative to the hole axis HA, a first area A1 of the first opening 18a, and/or the difference or the ratio between the first area A1 and a second area A2. For example, in the third embodiment, the first area A1 of the first opening 18a is larger than the second area A2 of the second opening 18b. In this configuration, the second path resistance, which corresponds to the flow of the fluid in the communication port 18 in the second direction F2, is larger than the first path resistance, which corresponds to the flow of the fluid in the communication port 18 in the first direction F1. This allows the fluid to flow from the reservoir tank 20 to the cylinder bore 12 at the relatively low first flow rate and from the cylinder bore 12 to the reservoir tank 20 at the relatively high second flow rate.

The flow modulator 30 includes the conical portion 18e of the communication port 18. In a state where the fluid passes through the communication port 18 in the first direction F1, the conical portion 18e concentrates the flow of the fluid to increase the speed of the fluid in the first direction F1. In a state where the fluid passes through the communication port 18 in the second direction F2, the conical portion 18e diffuses the flow of the fluid to reduce the speed of the fluid in the second direction F2.

In the third embodiment, a movable member such as the valve member 31 of the first embodiment may be omitted from the flow modulator 30.

The present invention is not limited to the above embodiments (or one or more aspects thereof). For example, the embodiments may be modified as follows.

Figure 8:
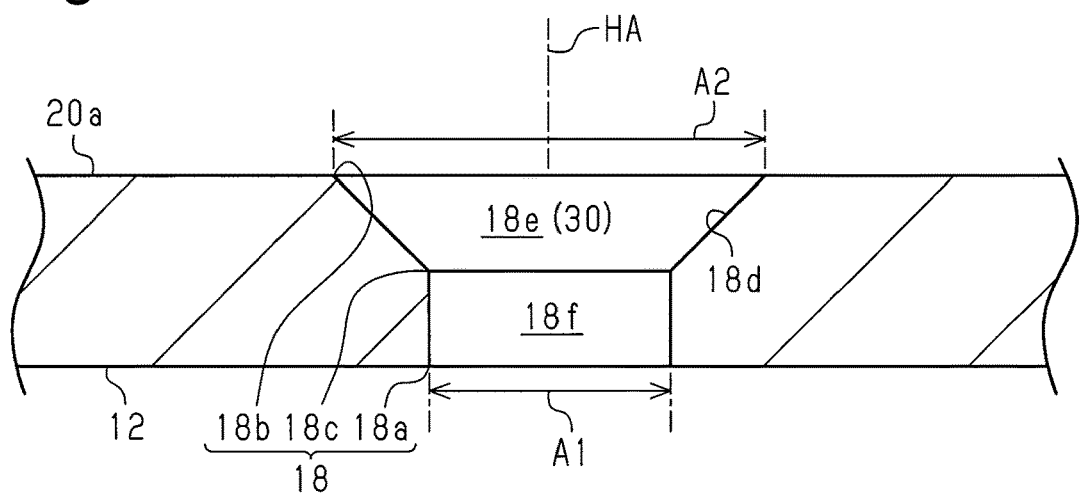
FIG. 8 is a schematically enlarged cross-sectional view showing a first modified example of a bicycle hydraulic device.

FIG. 8 shows a first modified example in which one end of the conical portion 18e of the communication port 18 is defined by the second opening 18b, which is located in the tank wall 20a of the reservoir tank 20. In the first modified example, the communication port 18 includes the conical portion 18e and the cylindrical bore portion 18f, which extends from another end of the conical portion 18e, or the step 18c, with a uniform inner diameter. Contrary to the third embodiment, in the first modified example, in a state where the fluid passes through the communication port 18 in the second direction F2, the conical portion 18e concentrates the flow of the fluid to increase the speed of the fluid. In a state where the fluid passes through the communication port 18 in the first direction F1, the conical portion 18e diffuses the flow of the fluid to reduce the speed of the fluid.

Figure 9:
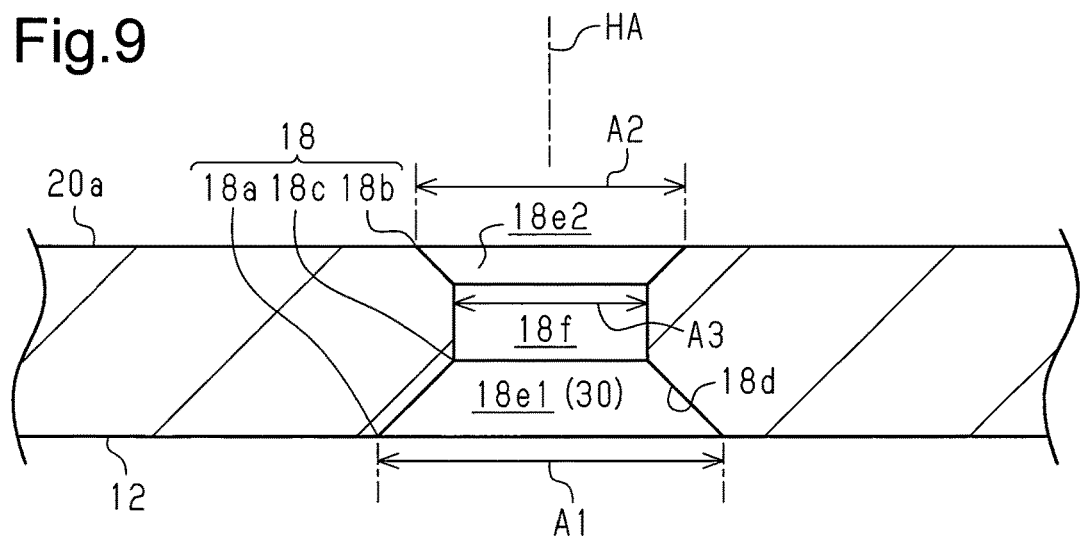
FIG. 9 is a schematically enlarged cross-sectional view showing a second modified example of a bicycle hydraulic device.

FIG. 9 shows a second modified example in which the communication port 18 includes a first conical portion 18e1, which includes the first opening 18a located in the wall defining the cylinder bore 12, a second conical portion 18e2, which includes the second opening 18b located in the tank wall 20a of the reservoir tank 20, and the cylindrical bore portion 18f, which is located between the two conical portions 18e1, 18e2. The first area A1 of the first opening 18a is larger than the second area A2 of the second opening 18b. The cylindrical bore portion 18f has a third area A3 that is smaller than the second area A2 of the second opening 18b. The second modified example and the second embodiment has the same operation.

Figure 10:
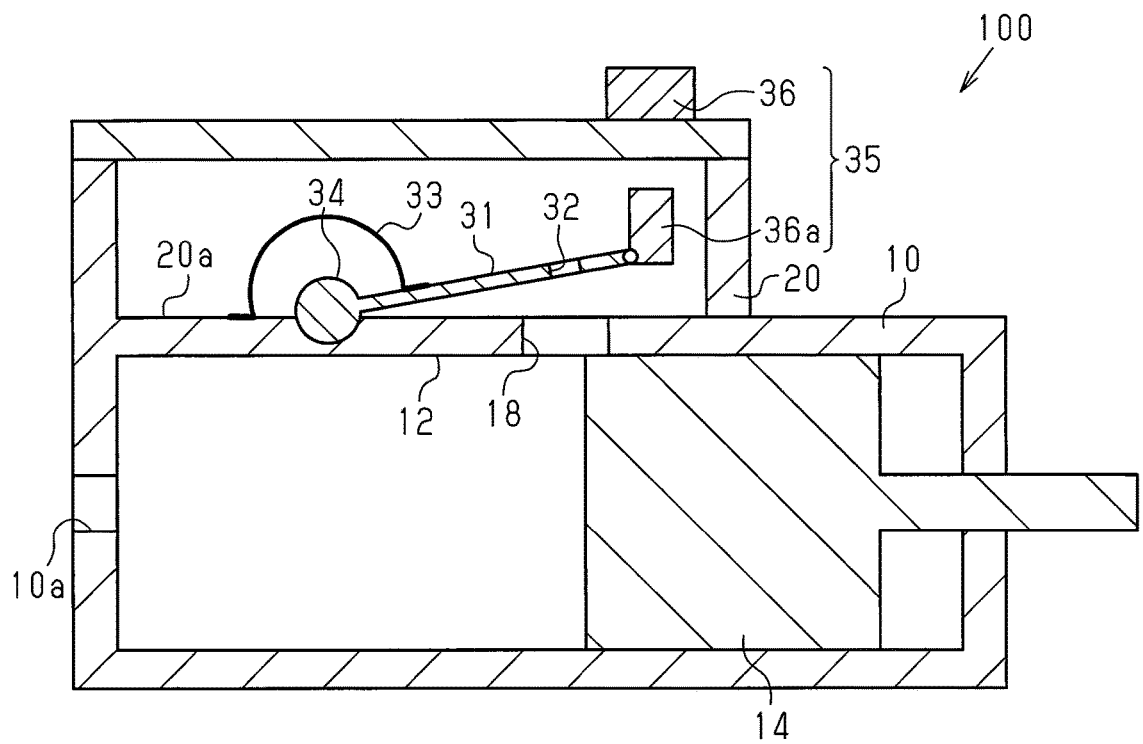
FIG. 10 is a schematically cross-sectional view showing a third modified example of a bicycle hydraulic device.

FIG. 10 shows a third modified example of a hydraulic operating device 100 that further includes a movement mechanism 35, which moves the valve member 31 between the first position where the communication port 18 is closed and the second position where the communication port 18 is open.

The movement mechanism 35 of the third modified example includes a magnet 36 that holds the valve member 31 at the second position (refer to FIG. 10) in a contactless manner from outside the cylinder 10 and the reservoir tank 20. The magnet 36 magnetically attracts the valve member 31 and produces a magnetic attraction force that is sufficient to separate the valve member 31 from the communication port 18. In a case that the valve member 31 is not formed from a magnetic element such as a metal, it is preferred that as shown in FIG. 10, the valve member 31 be connected to a magnetic element 36a, which may be a metal or a second magnet. The magnetic attraction force of the magnet 36 lifts the magnetic element 36a integrally with the valve member 31 toward the magnet 36. The magnet 36 may be a permanent magnet such as a neodymium magnet.

The operation of the movement mechanism 35 will now be described.

The maintenance of the bicycle hydraulic system 1 includes filling of the hydraulic line, which includes the hydraulic operating device 100, the hydraulic hose H, and the hydraulic operated device 200, with the fluid and bleeding for purging air bubbles from the hydraulic line. The filling of the fluid and the bleeding is typically performed through a bleeding port (not shown) that connects the reservoir tank 20 to an outer side of the hydraulic operating device 100. During the maintenance, in a case that the user places the magnet 36, for example, on an outer surface of the reservoir tank 20, the magnetic attraction force of the magnet 36 lifts the valve member 31 from the communication port 18 to open the communication port 18. This improves the efficiency for filling the hydraulic line with the fluid through the communication port 18 and the efficiency for bleeding through the communication port 18. When the maintenance is completed, the user may move the magnet 36 away from the reservoir tank 20 to return the valve member 31 to the first position.

Figure 11:
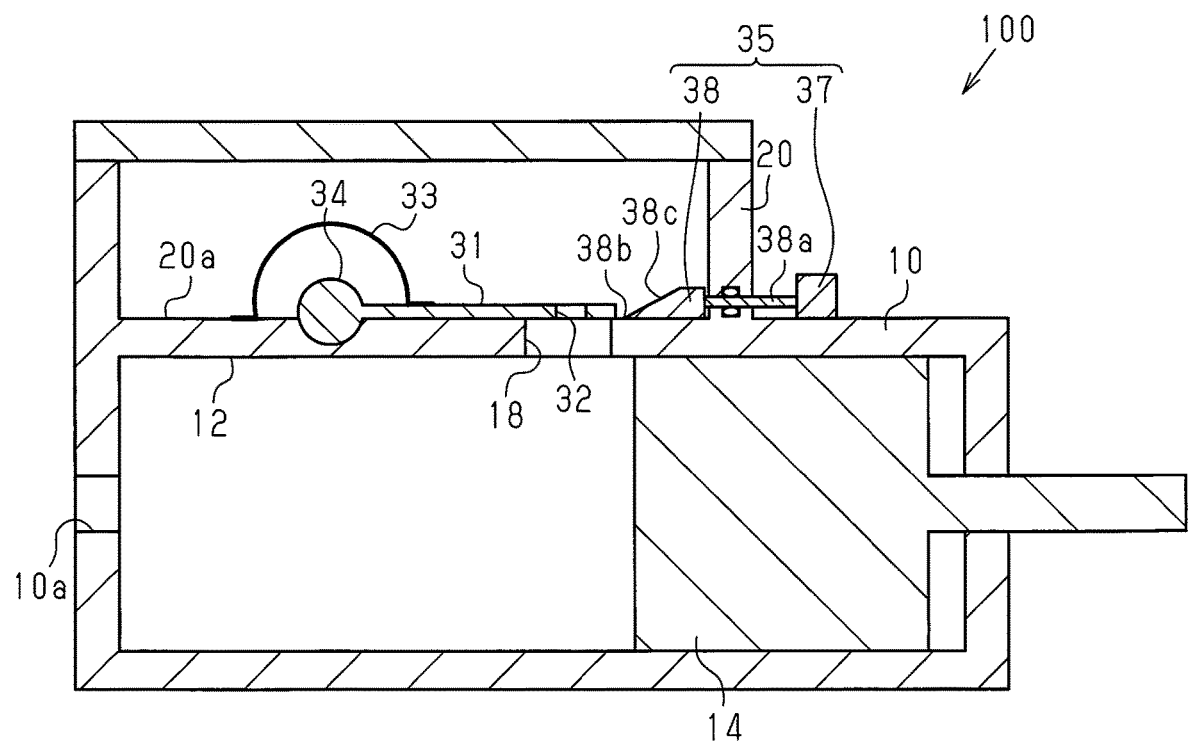
FIG. 11 is a schematically cross-sectional view showing a fourth modified example of a bicycle hydraulic device.

FIG. 11 shows a fourth modified example in which the movement mechanism 35 includes a manual operation portion 37, which is located outside the reservoir tank 20 and moved by a manual operation, and a connection portion 38, which is connected to the valve member 31 inside the reservoir tank 20 to transmit the movement of the manual operation portion 37 to the valve member 31. The movement mechanism 35 of the fourth modified example is configured as a valve member lift that converts a rotation operation or a reciprocal linear operation, which is performed on the manual operation portion 37 by the user, into upward or downward movement of the valve member 31 through the connection portion 38. The manual operation portion 37 may include a knob that outwardly projects from the reservoir tank 20.

The connection portion 38 includes a shaft 38a, which extends through a tank wall of the reservoir tank 20, and a slider 38b, which is connected to the shaft 38a. The shaft 38a is supported by the reservoir tank 20 to move the slider 38b in a reciprocal and linear manner. If necessary, a seal component such as an O-ring is arranged on the reservoir tank 20 and/or the shaft 38a.

The slider 38b includes a tip, which is directed toward the valve member 31, and an inclined surface 38c, which is continuous with the tip at a side opposite to the shaft 38a.

The tip of the slider 38*b* may have a bevel angle that is set so that when the connection portion 38 forwardly moves and comes into contact with a distal end of the valve member 31, the tip and the inclined surface 38*c* of the slider 38*b* smoothly lift the valve member 31. It is preferred that the distal end of the valve member 31, which first contacts the slider 38*b* when the connection portion 38 forwardly moves, have a downward bevel surface. The typical inclined surface 38*c* is a flat surface having a constant inclination angle. Instead, the inclined surface 38*c* may be an inwardly curved surface of which the inclination angle continuously changes.

The shaft 38*a* has a uniform contour and may be a threaded shaft or a thread-free shaft. In a case that the shaft 38*a* is threaded, connection portions of the manual operation portion 37 and the shaft 38*a* and/or connection portions of the shaft 38*a* and the slider 38*b* are configured to convert the rotation operation, which is performed on the manual operation portion 37 by the user, into linear movement of the slider 38*b*. In this case, the slider 38*b* linearly moves forward and backward without rotating in accordance with the rotation direction and the rotation angle of the manual operation portion 37 operated by the user. In a case the shaft 38*a* is free of a thread, the shaft 38*a* and the slider 38*b* may be rigidly connected to each other. Alternatively, the shaft 38*a*, the slider 38*b*, and the manual operation portion 37 may be configured to be a single piece. In this case, pushing and pulling of the manual operation portion 37, which are linearly operated by the user, are directly transmitted to the slider 38*b*.

The movement mechanism 35 may include a guide, which is located inside and/or outside the reservoir tank 20 to guide the slider 38*b*. The guide may be configured to limit the length by which the slider 38*b* moves. Although not restrictive, the guide may include a rail, a groove, and a tubular bushing.

During the maintenance, when the user rotates the manual operation portion 37 in a first direction or pushes the manual operation portion 37 toward an inner side of the reservoir tank 20, the slider 38*b* of the connection portion 38 comes into contact with the valve member 31, and the inclined surface 38*c* of the slider 38*b* lifts the valve member 31 to separate the valve member 31 from the communication port 18. The communication port 18 opens by an open degree corresponding to the operated amount of the manual operation portion 37. This improves the efficiency for filling the hydraulic line with the fluid through the communication port 18 and the efficiency for bleeding through the communication port 18. When the maintenance is completed, the user may rotate the manual operation portion 37 in a second direction or pull the manual operation portion 37 to separate the slider 38*b* from the valve member 31 and return the valve member 31 to the first position.

The movement mechanism 35 may include a link, which is mechanically connected to the valve member 31, instead of the slider 38*b*. The link is located in the reservoir tank 20 and configured to move the valve member 31 to a position (e.g., height) corresponding to the operated amount of the manual operation portion 37.

Figure 12:
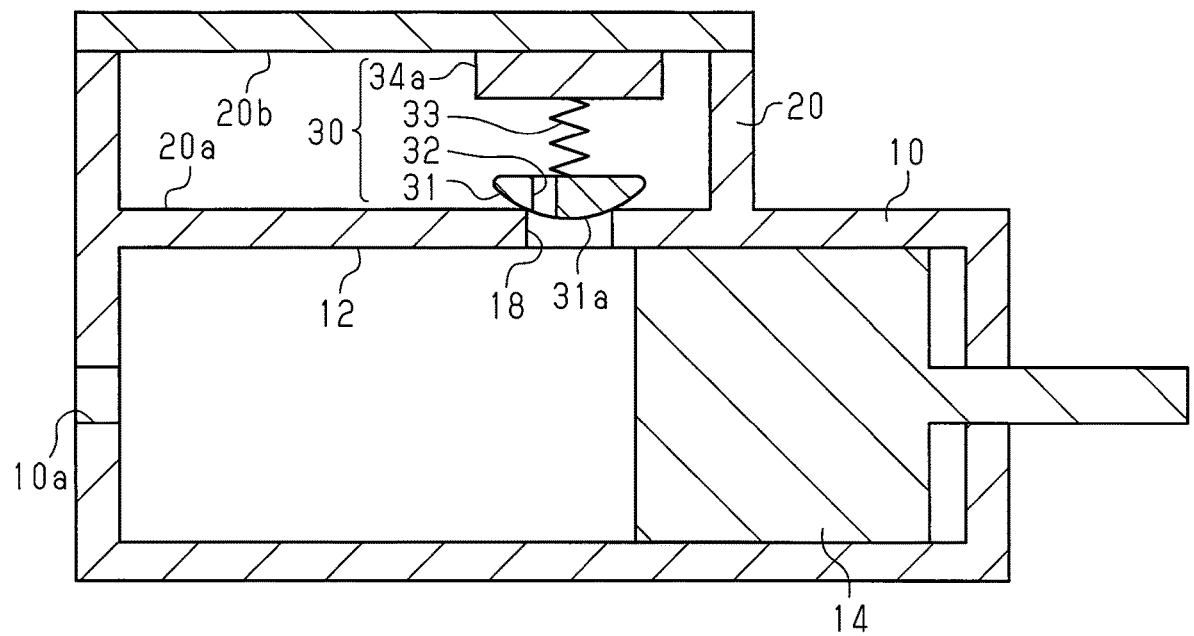
FIG. 12 is a schematically cross-sectional view showing a fifth modified example of a bicycle hydraulic device.

FIG. 12 shows a fifth modified example in which the valve member 31 includes a curved surface 31*a*, which may be semispherical and contact an open edge of the communication port 18, and the orifice 32. The valve member 31 includes a valve member support 34*a* located on a tank wall (upper wall) 20*b* of the reservoir tank 20, which is opposite to the tank wall having the communication port 18, in the hole axis HA of the communication port 18. The biasing member 33, which suspends from the valve member support 34*a*, includes an end to which the valve member 31 is coupled. The biasing force of the biasing member 33 is set so that the valve member 31 is separated from the communication port 18 by the fluid flowing through the communication port 18 from the cylinder 10 toward the reservoir tank 20. In the fifth modified example, the valve member 31 is capable of closing the communication port 18 mainly with the mass of the valve member 31. Thus, the biasing member 33 may have the natural length when connecting the valve member support 34*a* and the valve member 31.

Figure 13:
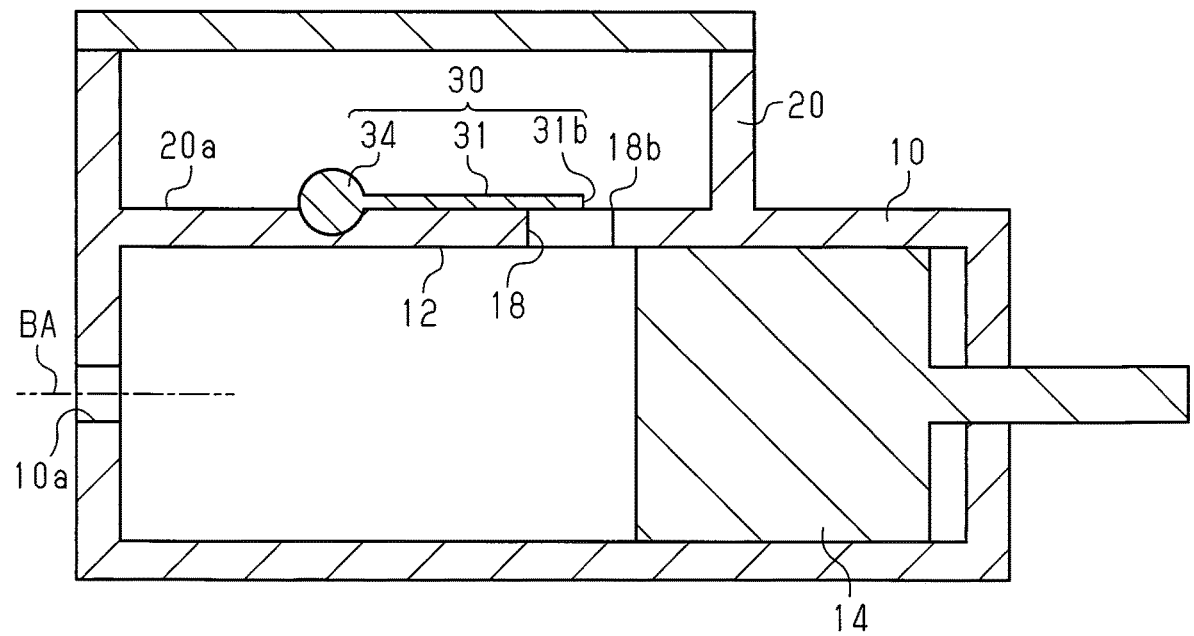
FIG. 13 is a schematically cross-sectional view showing a sixth modified example of a bicycle hydraulic device.

FIG. 13 shows a sixth modified example in which the flow modulator 30 includes the valve member 31 and the hinge 34 but does not include the orifice 32 and the biasing member 33. The valve member 31 is supported by the hinge 34 to cover the communication port 18 with the mass of the valve member 31. In a state where the valve member 31 is located at a first position, the distal end 31*b* of the valve member 31 does not reach the edge defining the second opening 18*b* in the communication port 18. This forms a slit between the distal end 31*b* and the edge defining the second opening 18*b*. In a state where the valve member 31 covers the communication port 18, the slit fluidly communicates the communication port 18 and the reservoir tank 20. The flow modulator 30 of the sixth modified example has the same operation as that of the first embodiment. The sixth modified example reduces the size and the weight of the flow modulator 30.

Two or more of the above embodiments and modified examples may be combined. In one example, although the valve member 31 of the second embodiment does not include an orifice, the valve member 31 may include the orifice 32 in the same manner as the first embodiment. The flow passage cross-sectional area $c2$ of the orifice 32 is smaller than the first flow passage cross-sectional area $c1a$ of the first through hole 18*x*. In a state where the valve member 31 of the second embodiment partially closes the first through hole 18*x*, the flow passage cross-sectional area of the communication port 18 is equal to the sum of the second flow passage cross-sectional area $c1b$ and the flow passage cross-sectional area $c2$ of the orifice 32 and smaller than the first flow passage cross-sectional area $c1a$ of the first through hole 18*x*.

In another example, although the flow modulator 30 of the third embodiment does not include a valve member, the flow modulator 30 may include the valve member 31 of the first embodiment, another embodiment, or one of the modified examples.

Figure 7:
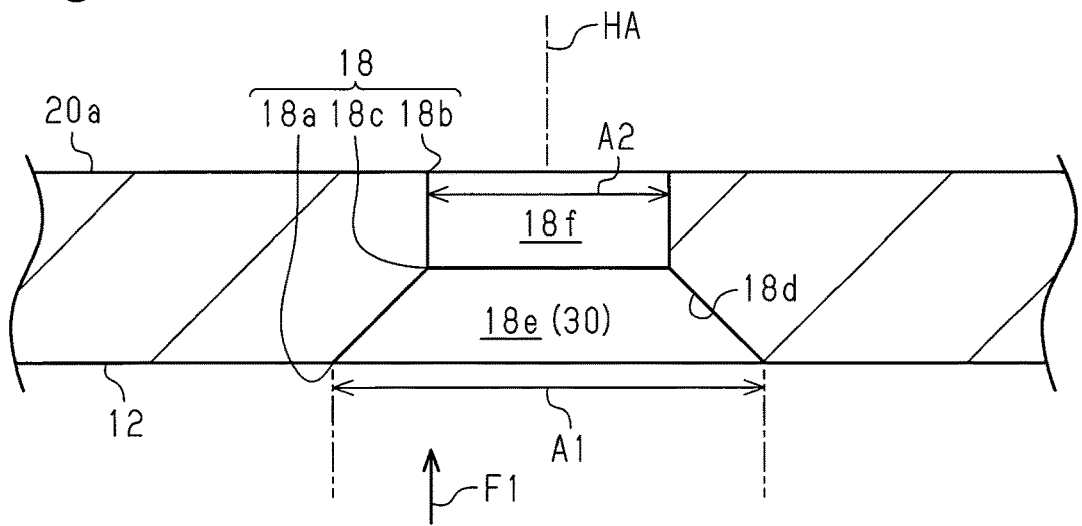
FIG. 7 is a schematically enlarged cross-sectional view showing a third embodiment of a bicycle hydraulic device.

The orifice 32 of the valve member 31 may have the same shape as the stepped through holes shown in FIGS. 7 to 9.

The reservoir tank 20, the cylinder 10, and the piston 14 may each be a metal member or a non-metal member such as a synthetic resin member.

In the examples shown in the drawings, the reservoir tank 20 and the cylinder 10 are configured as a single piece. However, in some of the examples, the reservoir tank 20 and the cylinder 10 may be configured as separate components. Then, the components may be integrated with the body 40 through any fastening process such as welding, bonding, or bolt-fastening.

The hydraulic operating device 100 is not limited to the piston pushing type and may be of a piston pulling type. US2007/0283691A1 describes an example of the piston-pushing type of a bicycle hydraulic operating device. US2015/0321725A1 describes an example of the piston-pulling type of a bicycle hydraulic operating device. US2007/0283691A1 and US2015/0321725A1 are incorporated herein by reference.

The hydraulic operating device 100 may be coupled to a bicycle handlebar so that the body 40 is accommodated in the bicycle handlebar and the lever 41 is exposed from the bicycle handlebar to the exterior.

The bicycle hydraulic device is not limited to the hydraulic operating device 100 and may be configured as the hydraulic operated device 200 such as the brake caliper.

The bicycle hydraulic system 1 is not limited to a hydraulic disc brake system and may be configured as a bicycle hydraulic system other than the hydraulic disc brake system such as a hydraulic rim brake system, a hydraulic gear change system, a hydraulic suspension system, or a hydraulic adjustable seatpost.

It should be apparent to those skilled in the art that the present invention may be embodied in many other specific forms without departing from the scope of the invention. For example, the above embodiments and examples (or one or more aspects thereof) may be used in combination with each other, and some components may be omitted. The scope of the invention should be determined with reference to the appended claims, along with the full scope of equivalents to which such claims are entitled.

The invention claimed is:

1. A bicycle hydraulic device comprising:
a cylinder including a cylinder bore;
a piston located in the cylinder bore and movable between an initial position and an actuation position;
a reservoir tank that is in fluidal communication with the cylinder bore through a communication port arranged in the cylinder, the communication port including a first opening and a second opening, the first opening of the communication port being located in a wall defining the cylinder bore, and the second opening of the communication port being located in a tank wall of the reservoir tank;
a flow modulator configured to modulate a flow behavior of a fluid in accordance with a direction in which the fluid flows in the communication port, the flow modulator including a valve member arranged in the reservoir tank, the valve member being movable to at least partly cover the second opening of the communication port located in the tank wall of the reservoir tank, and in response to the valve member receiving a flow of the fluid directed toward the reservoir tank from the cylinder bore through the communication port, the valve member is movable to be spaced from and open the second opening of the communication port by the flow of the fluid directed toward the reservoir tank from the cylinder bore through the communication port;
a body including the cylinder; and
a lever arranged on the body, wherein the lever is pivotal about an axis of the lever between a rest position and an operation position.

2. The bicycle hydraulic device according to claim 1, wherein the flow modulator is configured so that a first path resistance at the communication port in a state where the fluid is directed from the cylinder bore toward the reservoir tank differs from a second path resistance at the communication port in a state where the fluid is directed from the reservoir tank toward the cylinder bore.

3. The bicycle hydraulic device according to claim 2, wherein the flow modulator is configured so that the second path resistance is larger than the first path resistance.

4. The bicycle hydraulic device according to claim 1, wherein the valve member is capable of opening and closing at least part of the communication port.

5. The bicycle hydraulic device according to claim 4, wherein the flow modulator further includes a biasing member that biases the valve member toward the communication port.

6. A bicycle hydraulic device comprising:
a cylinder including a cylinder bore;
a piston located in the cylinder bore, wherein the piston is movable between an initial position and an actuation position;
a reservoir tank that is in fluidal communication with the cylinder bore through a communication port arranged in the cylinder, the communication port including a first opening and a second opening, the first opening of the communication port being located in a wall defining the cylinder bore, and the second opening of the communication port being located in a tank wall of the reservoir tank;
a valve member arranged in the reservoir tank, wherein the valve member is capable of opening and closing at least part of the communication port in accordance with a flow of a fluid in the communication port, the valve member being movable to at least partly cover the second opening of the communication port located in the tank wall of the reservoir tank, and wherein in response to the valve member receiving a flow of the fluid directed toward the reservoir tank from the cylinder bore through the communication port, the valve member is movable to be spaced from and open the second opening of the communication port by the flow of the fluid directed toward the reservoir tank from the cylinder bore through the communication port;
a body including the cylinder; and
a lever arranged on the body, wherein the lever is pivotal about an axis of the lever between a rest position and an operation position.

7. The bicycle hydraulic device according to claim 6, further comprising a biasing member that biases the valve member toward the communication port.

8. The bicycle hydraulic device according to claim 5, wherein the biasing member produces a biasing force that is set so that the valve member is separated from the communication port by the fluid flowing from the cylinder bore toward the reservoir tank through the communication port.

9. A bicycle hydraulic device comprising:
a cylinder including a cylinder bore;
a piston located in the cylinder bore and movable between an initial position and an actuation position;
a reservoir tank that is in fluidal communication with the cylinder bore through a communication port; and
a flow modulator configured to modulate a flow behavior of a fluid in accordance with a direction in which the fluid flows in the communication port, wherein the flow modulator includes a valve member arranged in the reservoir tank, wherein the valve member is capable of opening and closing at least part of the communication port,
wherein
the communication port includes a first through hole and a second through hole, which is aligned with the first through hole in a circumferential direction of the cylinder, and
the valve member is arranged to be capable of opening and closing at least part of only the first through hole.

10. The bicycle hydraulic device according to claim 9, wherein
the first through hole has a first flow passage cross-sectional area, and the second through hole has a second flow passage cross-sectional area that differs from the first flow passage cross-sectional area.

11. The bicycle hydraulic device according to claim 10, wherein the first flow passage cross-sectional area is larger than the second flow passage cross-sectional area.

12. The bicycle hydraulic device according to claim 4, wherein the valve member includes an orifice that fluidly communicates the communication port and the reservoir tank in a state where the valve member covers the communication port.

13. The bicycle hydraulic device according to claim 4, wherein the valve member is connected to the tank wall of the reservoir tank by a hinge.

14. The bicycle hydraulic device according to claim 4, further comprising a movement mechanism that moves the valve member between a first position where the communication port is closed and a second position where the communication port is open.

15. The bicycle hydraulic device according to claim 14, wherein the movement mechanism includes a magnet that holds the valve member at the second position in a contactless manner from outside the cylinder and the reservoir tank.

16. The bicycle hydraulic device according to claim 14, wherein the movement mechanism includes
a manual operation portion located outside the reservoir tank and moved by a manual operation, and
a connection portion connected to the valve member inside the reservoir tank to transmit movement of the manual operation portion to the valve member.

17. The bicycle hydraulic device according to claim 1, wherein
the communication port includes a through hole that includes the first opening and the second opening,
the through hole includes a conical portion defined by an inclined surface that defines at least part of the through hole and is inclined relative to a hole axis of the through hole, and
the flow modulator includes the conical portion.

18. The bicycle hydraulic device according to claim 17, wherein
one end of the conical portion is defined by one of the first opening and the second opening, and
the through hole further includes a cylindrical bore portion that extends from another end of the conical portion with a uniform inner diameter.

19. The bicycle hydraulic device according to claim 18, wherein
the first opening has a first area,
the second opening has a second area, and
the first area is larger than the second area.

* * * * *